Figure 1:
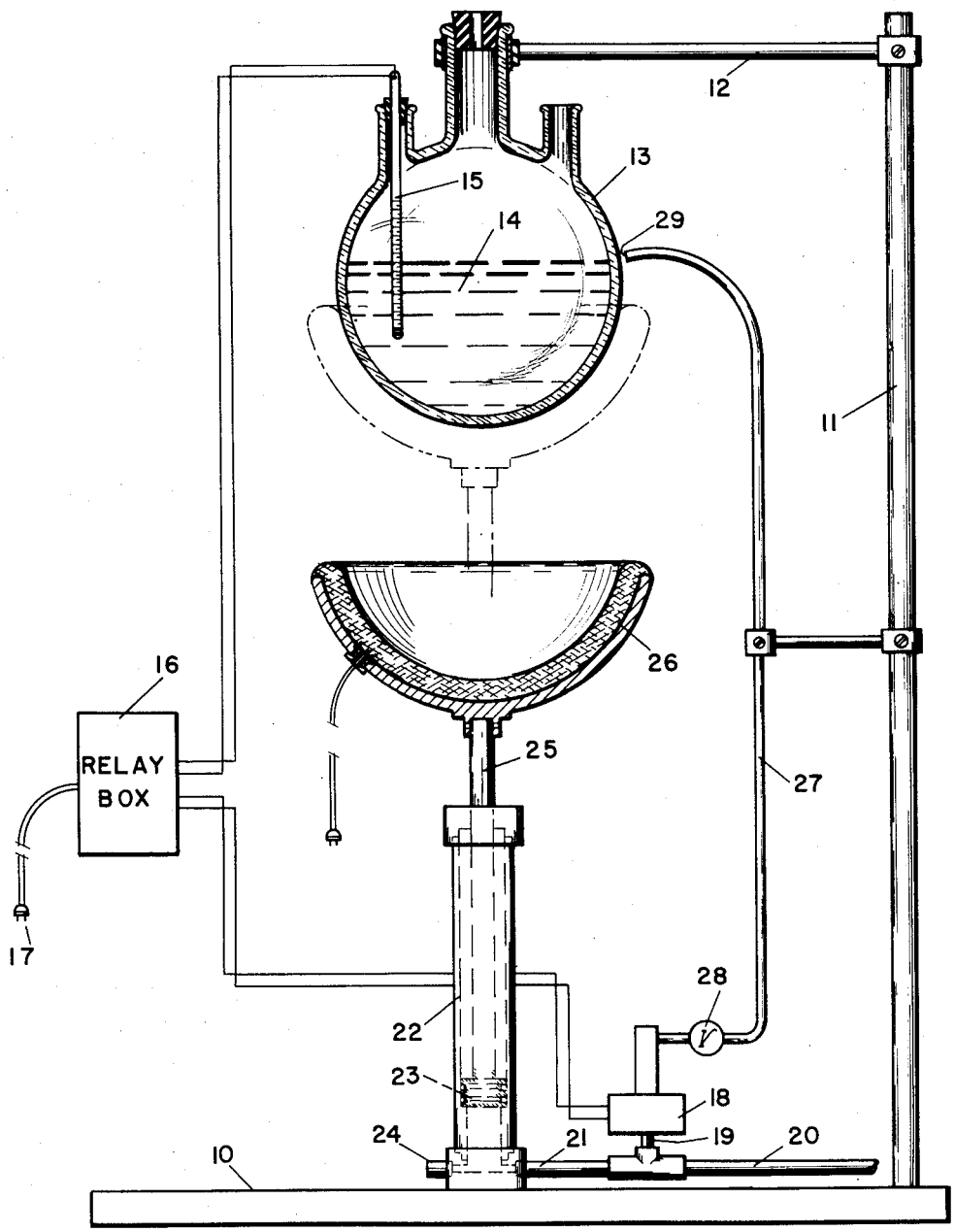

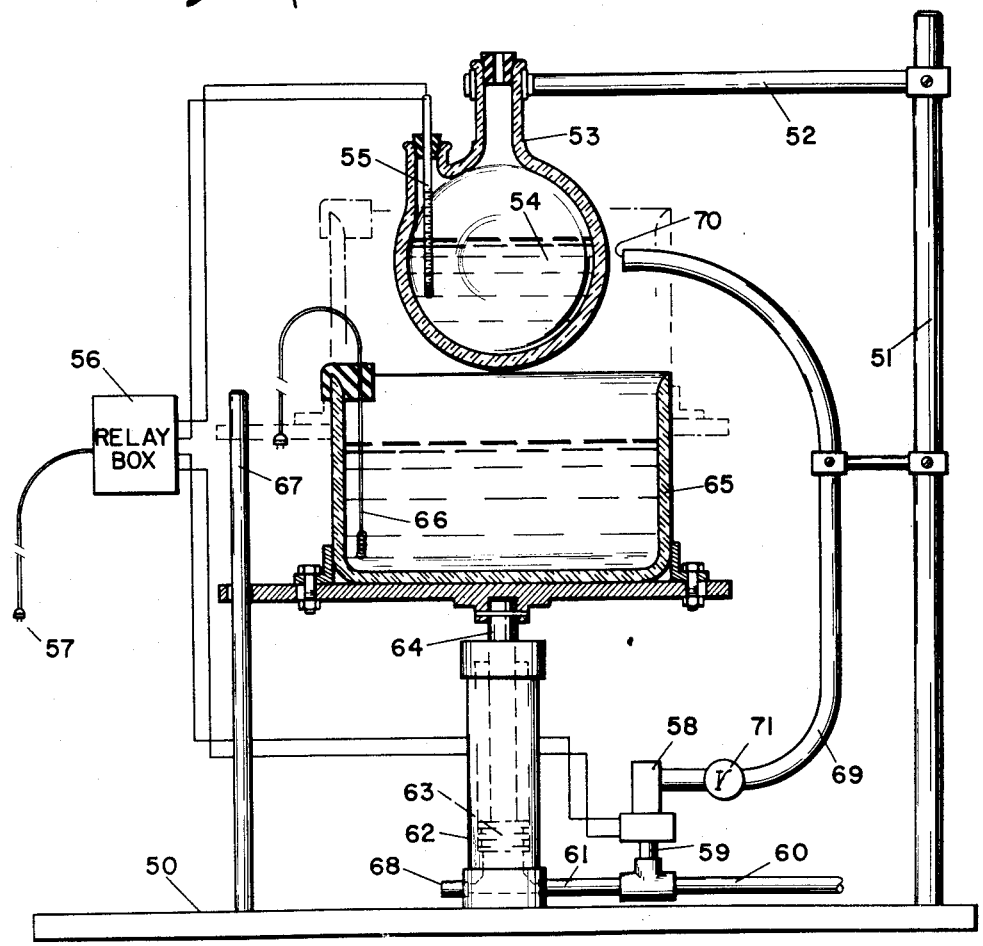

United States Patent Office 2,955,025
Patented Oct. 4, 1960

2,955,025

CHEMICAL REACTION VESSEL WITH AUTOMATICALLY CONTROLLED HEATING SOURCE

Daniel R. Conlon, 606 Meetinghouse Road, Jenkintown, Pa.

Filed Oct. 7, 1957, Ser. No. 688,603

1 Claim. (Cl. 23—259)

This invention relates to apparatus for conducting laboratory procedures and to methods of conducting chemical reactions in laboratory apparatus.

Serious laboratory fires and/or explosions have occurred in connection with certain types of reactions, such as Grignard reactions, because if these reactions are allowed to proceed at a temperature which is excessively high, then the reaction tends to accelerate rapidly to raise the reaction temperature very much higher. Because such hazards exist, it has been the general practice to encourage an operator to watch a Grignard reaction, and to avoid leaving a Grignard reaction unattended. Ordinarily such hazardous reactions proceed smoothly, and the attendant has little to do except to be prepared for immediate action in the event of an adverse rise of temperature. Several other requirements for conducting laboratory procedures do not adapt themselves to complete reliance upon thermostatic switches for controlling electrical heaters.

In accordance with the present invention, the method of conducting a laboratory experiment includes the steps of placing the reactants in a reaction vessel, providing reaction conditions sensing means (e.g. a thermometer for measuring temperature) in the reaction vessel, providing at least one heat transfer device shiftable to and from an operative position contiguous to the exterior of the vessel and to and from an inoperative position remote from the reaction vessel, and providing a control circuit such that the condition-sensing means in the reaction vessel initiates the shifting of the heat transfer means to and/or from the operative position. The apparatus of the present invention comprises a reaction-condition-sensing means, the position of said shiftable heat transfer device being regulated by a control circuit responsive to the reaction condition sensing means.

In the drawings,

Fig. 1 is a schematic view of a preferred embodiment of the invention. Fig. 2 is a schematic view of an alternative embodiment of the invention.

Fig. 1 shows a base 10 supporting a column 11 similar to the ring stand conventionally employed for chemical laboratory apparatus. Attached to an upper portion of the column is a rod 12 clamped to a three necked round bottomed reaction flask 13 containing the reactants 14 for an organic synthesis.

A thermocouple 15 immersed in the reactants 14 has an electrical wire extending to a relay box 16. The operation of the relay box 16 is responsive to the temperature of the reactants 14 to connect or disconnect a source of electrical power 17 with a solenoid 18 actuating a valve 19. The valve 19 controls the flow of compressed air between an air supply line 20 and a lift-line 21, thus controlling the compressed air injected into a cylinder 22. When the electricity flows thru the solenoid 18, thereby permitting compressed air to flow through the supply line 20, valve 19, lift-line 21, and into the cylinder 22, a piston 23 is elevated and maintained in the elevated position.

The apparatus of Fig. 1 has the advantageous feature of providing a small amount of intended leakage in the cylinder 22. A small porous plug 24 muffles the noise of such air leakage. The porosity of the plug 24 is such that the piston 23 is elevated so long as the compressed air flows thru the valve 19, but such that the piston descends as soon as the flow of compressed air ceases.

Attached to the piston 23 is a support 25 carrying a hemispherical electrical heater 26. When the temperature of the reactants 14 becomes excessive, the thermocouple 15 detects the temperature rise, and actuates the relay box 16, thereby causing an interruption of the flow of current from an electrical source 17, thereby closing the valve 19, thereby disconnecting the air in the cylinder 22 from the compressed air supply line 20, thereby permitting the compressed air to escape thru the porous plug 24, thereby causing the heater 26 to fall away from the flask 13.

The relay box may or may not be adapted to respond to the temperature of the reactants falling below some predetermined value. If the heater is to be returned to its operative position automatically, the low temperature of the reactants 14, acting through the thermocouple 15 and relay box 16, actuates the solenoid 18 of the valve 19, so that compressed air enters the cylinder 22 to raise the piston 23 and to raise the heater 26 against the flask 13. Because the voltage applied to the heater is adjusted to provide substantially the heat desired for the normal reaction, the shifting of the heater to and from the reaction flask affects the progress of the reaction much more advantageously than a heater having regulators favoring a constant temperature range.

Particular attention is directed to the feature of the invention whereby the heater 26 is withdrawn rapidly from the flask promptly after the reactants 14 exceed the predetermined temperature. The rapid withdrawal of the source of heat is of critical importance in chemical synthesis such as Grignard reactions, inasmuch as fire and/or explosion readily result if the adverse temperature rise is not instantly checked. It should be especially noted that the piston may move down rapidly when the air pressure is reduced in the cylinder 22 without creating an excessive noise because the porous plug 24 provides a muffler capable of greatly reducing the noise level attributable to such escape of air.

At the same time that the valve 19 causes the heater 26 to be withdrawn from the flask 13, the compressed air supply line 20 is connected to a cooling line 27. This cooling line includes a normally open valve 28 through which the compressed air passes to an outlet 29 adjustably positioned adjacent to the flask 13. Thus the compressed air supply may serve to cool the flask 13 by the air stream leaving the outlet 29 of the cooling tube 27. If the cooling air blast is not desired, then the valve 28 can be closed.

In Fig. 2, a base 50 supports a column 51 carrying a rod 52 clamped to a flask 53 containing reactants 54. A thermostatic switch 55 can be equipped with electrical contacts so that when the thermometer liquid is outside a predetermined range, thermostatic switch 55 actuates a relay box 56. The relay box 56 controls the flow of electricity from a source 57 to a solenoid 58, which actuates a valve 59. A compressed air supply line 60 is connected through the valve 59 to a lift line 61, which feeds compressed air to a cylinder 62. A piston 63 fitting within the cylinder 62 can be lifted by the compressed air supplied to the cylinder through the supply line 60, valve 59, and lift line 61. Numerous advantages are achieved because the apparatus provides a small amount of controlled leakage of air. A porous plug 68 in the cylinder 62 permits such air leakage to occur with minimized noise.

The piston 63 carries a support 64 serving also as a base to which may be secured a pot 65 containing a heat transfer liquid, such as a high boiling hydrocarbon oil. If desired, any of several pots of heat transfer liquid can be employed, depending on the laboratory procedure contemplated. For example, a mixture of equal parts of chloroform and carbon tetrachloride containing a small amount of silicone grease serves as a relatively non-foaming solvent for Dry Ice for maintaining a liquid at about −79° C., and a pot for such liquid may have Dewar flask type of insulation. The use of a pot of hot oil is more frequent than the use of any type of cooling pot.

An electric heater 66 can be immersed in the oil. In order to assure aligned movement of the pot 65 to and from the advanced and retarded positions, a guide post 67 can be secured to the base 50 and fit within sliding bearings in a portion of the support 64.

In the operation of such heating apparatus, the reactants 54 in the flask 53 are heated to a desired temperature by the action of the heater 66 on the heat transfer liquid, the pot being elevated so that the flask 53 is partially immersed in the hot oil in the pot 65. If the temperature rises above the predetermined critical limit, then the thermostatic switch 55 transmits the electrical impulse to the relay box 56, which thus actuates the valve 59 to bring about the decrease in the air pressure in the cylinder, causing the piston 53 to lower, and causing the pot 65 of hot oil to be lowered from the flask 53. The rate of withdrawal of the hot oil from the flask is regulated to be slow enough to prevent excessive splashing of the hot oil. After the temperature of the reactants has cooled sufficiently to justify the application of additional heat, the pot of hot oil can be repositioned manually, or the relay box 56 can be adjusted so that the valve 59 is actuated to allow the compressed air to elevate the piston 63 and thus to raise the pot of oil around the flask 53.

Particular attention is directed to that feature of the apparatus whereby the lowering of the piston and the expulsion of the air from the cylinder does not create excessive noise because the escaping air is directed thru a porous plug 68, which acts as a muffler. The air from the cylinder passes thru the porous plug 68 to achieve a nearly noiseless escape of air from the cylinder during the lowering of the pot of hot oil.

It is sometimes desirable to cool the flask 53 at a rate more rapid than results from mere exposure of the flask to the room conditions after the lowering of the pot of hot oil. There is provided a cooling tube 69 having an outlet 70 positioned adjacent to the flask 53 directing a blast of compressed air on the flask when the pot of hot oil is lowered and when a valve 71 in the cooling tube is open.

In maintaining the contents of a reaction vessel at −40° C., the heat of the room supplements the cooling action of a Dry Ice bath, and the automatic raising and lowering of the pot provides a convenient manner for maintaining such a temperature. The pot of Dry Ice bath may shift up and down less than the full stroke of the piston and in proportion to the cooling needed to overcome the effects of the heat generated by the chemical reaction in the flask.

It is sometimes advantageous to provide suitable adjustments for the positioning of some of the components of the apparatus, but the general working principle whereby the source of heat is withdrawn promptly after the attainment of an excessive temperature in the reactants is applicable in numerous modifications of the apparatus. Hydraulic jacks, lazy tongs, toggle bars, flexible bellows, diaphragms, screw jacks, pulley arrangements, or other shifting means can be employed for shifting the heating device to and from the reaction vessel. In order to quench any adverse rise of temperature, pots of heat transfer liquid at a temperature significantly below the temperature of the heater can be shifted into position or other rapid cooling procedures, (e.g. spray devices) can be employed instead of the air blast described in connection with Figs. 1 and 2. The reaction vessel may be of any construction material or shape, and need not be the round bottomed glass flask shown in the drawings. Electronic controls can be employed instead of a simple electrical relay. A pneumatic relay can be employed for the control circuit instead of using an electrical control circuit. In any event, however, the heat transfer device is shifted from a position contiguous to the reaction vessel to a position significantly remote from the reaction vessel in response to a change of a condition such as temperature in the reaction vessel. Successful units have been constructed in which the heat transfer means was rapidly withdrawn upon the attainment of a critical pressure in the reaction vessel. However, it would require sensing means much too complex to be readily inserted within the flask in order to make the heat transfer device shift as a result of the reactants attaining a critical refractive index or some other such property. The apparatus is only rarely employed for routine manufacture of chemicals by sensitive reactions such as Grignard reactions. The apparatus is intended to serve primarily for research laboratory work involving many different types of reactions each month and is frequently employed in this manner. The present invention provides a sufficiently reliable monitor for a reaction that the apparatus can be left unattended for reasonable periods of time, while still providing flexibility regarding the monitoring conditions.

Obviously, various modifications can be made in the invention without departing from the scope of the invention as set forth in the appended claim.

The invention claimed is:

Apparatus for conducting a chemical reaction in a vessel comprising: temperature sensing means in said vessel; a nozzle directing a jet of compressed air onto the vessel; a piston shiftable vertically between an upper position and a lower position in a compressed air cylinder; a porous plug adapted to provide substantially noiseless escape of compressed air from the cylinder; a branched line supplying compressed air to said cylinder and to said nozzle; a valve in the line supplying compressed air to the nozzle, the closing of said valve being adapted to supply air to the cylinder to elevate the piston to its upper position and to maintain the piston in its upper position so long as said valve is closed and compressed air is supplied; a pot of heat transfer liquid carried by the piston so that the vessel is partially immersed in the heat transfer liquid while the piston is in its upper position and so that the vessel is above the heat transfer liquid when the piston is in its lower position; and a control circuit associating the temperature sensing means and the valve in the line supplying compressed air to the nozzle so that the temperature of the vessel is alternately influenced by the compressed air jet and by the heat transfer liquid in the pot as the pot is elevated and lowered in response to the temperature fluctuations of the reactants in the vessel.

References Cited in the file of this patent
UNITED STATES PATENTS
1,399,696    De Roo    Dec. 6, 1921